United States Patent
Okano et al.

(10) Patent No.: US 11,168,375 B2
(45) Date of Patent: Nov. 9, 2021

(54) STEEL PIPE OR TUBE FOR PRESSURE VESSELS, METHOD OF PRODUCING STEEL PIPE OR TUBE FOR PRESSURE VESSELS, AND COMPOSITE PRESSURE VESSEL LINER

(71) Applicant: JFE STEEL CORPORATION, Chiyoda-ku Tokyo (JP)

(72) Inventors: Hiroshi Okano, Tokyo (JP); Shusaku Takagi, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 305 days.

(21) Appl. No.: 16/333,339

(22) PCT Filed: Aug. 8, 2017

(86) PCT No.: PCT/JP2017/028839
§ 371 (c)(1),
(2) Date: Mar. 14, 2019

(87) PCT Pub. No.: WO2018/055937
PCT Pub. Date: Mar. 29, 2018

(65) Prior Publication Data
US 2019/0211414 A1 Jul. 11, 2019

(30) Foreign Application Priority Data
Sep. 21, 2016 (JP) .............................. JP2016-184871

(51) Int. Cl.
*C21D 6/00* (2006.01)
*C21D 7/12* (2006.01)
(Continued)

(52) U.S. Cl.
CPC ............. *C21D 8/105* (2013.01); *C21D 6/004* (2013.01); *C21D 6/005* (2013.01); *C21D 6/008* (2013.01);
(Continued)

(58) Field of Classification Search
None
See application file for complete search history.

(56) References Cited

U.S. PATENT DOCUMENTS 8,663,400 B2 3/2014 Omura et al.
8,852,366 B2 10/2014 Kondo et al.
(Continued)

FOREIGN PATENT DOCUMENTS

CN 102699628 A 10/2012
CN 103717774 A 4/2014
(Continued)

OTHER PUBLICATIONS

Machine translation of WO2011108764 (Year: 2011).*
(Continued)

*Primary Examiner* — Anthony J Zimmer
*Assistant Examiner* — Michael J Kachmarik
(74) *Attorney, Agent, or Firm* — Kenja IP Law PC

(57) ABSTRACT

A steel pipe or tube for pressure vessels having excellent quench crack resistance is provided. The steel pipe or tube for pressure vessels comprises: a specific chemical composition; and a metallic microstructure in which an average grain size of prior austenite grains is 500 μm or less, and an area fraction of microstructures other than ferrite is 50% or more.

7 Claims, 1 Drawing Sheet

(Unit:mm)

(51) Int. Cl.
*C21D 8/10* (2006.01)
*C21D 9/08* (2006.01)
*C22C 38/00* (2006.01)
*C22C 38/02* (2006.01)
*C22C 38/04* (2006.01)
*C22C 38/06* (2006.01)
*C22C 38/22* (2006.01)
*C22C 38/44* (2006.01)
*C22C 38/58* (2006.01)
*F17C 1/00* (2006.01)
*F17C 13/00* (2006.01)

(52) U.S. Cl.
CPC ............... *C21D 7/12* (2013.01); *C21D 9/085* (2013.01); *C22C 38/001* (2013.01); *C22C 38/02* (2013.01); *C22C 38/04* (2013.01); *C22C 38/06* (2013.01); *C22C 38/22* (2013.01); *C22C 38/44* (2013.01); *C22C 38/58* (2013.01); *F17C 1/00* (2013.01); *F17C 13/00* (2013.01); *C21D 2211/001* (2013.01); *C21D 2211/002* (2013.01); *C21D 2211/005* (2013.01); *C21D 2211/008* (2013.01); *F17C 2201/0104* (2013.01); *F17C 2203/0604* (2013.01); *F17C 2203/0639* (2013.01); *F17C 2203/0648* (2013.01); *F17C 2203/0663* (2013.01); *F17C 2203/0675* (2013.01); *F17C 2221/012* (2013.01); *F17C 2223/0123* (2013.01); *F17C 2223/036* (2013.01); *F17C 2260/011* (2013.01); *F17C 2270/0178* (2013.01); *F17C 2270/0184* (2013.01); *Y02E 60/32* (2013.01)

(56) References Cited

U.S. PATENT DOCUMENTS

| | | | |
|---|---|---|---|
| 8,974,612 B2 | 3/2015 | Takasawa et al. | |
| 9,896,751 B2 | 2/2018 | Kawata et al. | |
| 10,106,875 B2 | 10/2018 | Takagi et al. | |
| 2008/0201932 A1* | 8/2008 | Schlag | F16J 12/00 29/452 |
| 2012/0204994 A1* | 8/2012 | Anelli | C21D 8/10 138/177 |

| | | | |
|---|---|---|---|
| 2015/0368768 A1 | 12/2015 | Aratani et al. | |
| 2016/0053355 A1 | 2/2016 | Takagi et al. | |
| 2016/0091140 A1 | 3/2016 | Takagi et al. | |

FOREIGN PATENT DOCUMENTS

| | | |
|---|---|---|
| CN | 104968821 A | 10/2015 |
| CN | 105081003 A | 11/2015 |
| CN | 105102657 A | 11/2015 |
| EP | 2980246 A1 | 2/2016 |
| EP | 3272893 A1 | 1/2018 |
| JP | 2009074122 A | 4/2009 |
| JP | 2009275249 A | 11/2009 |
| JP | 2009293799 A | 12/2009 |
| JP | 2010037655 A | 2/2010 |
| JP | 4528346 B2 | 8/2010 |
| JP | 2012107332 A | 6/2012 |
| JP | 2014198878 A | 10/2014 |
| JP | 2014227573 A | 12/2014 |
| JP | 5928394 B2 | 6/2016 |
| JP | 2016172909 A | 9/2016 |
| JP | 6179977 B2 | 8/2017 |
| JP | 2018012855 A | 1/2018 |
| WO | 2011108764 A1 | 9/2011 |
| WO | 2014156187 A1 | 10/2014 |
| WO | 2014174845 A1 | 10/2014 |

OTHER PUBLICATIONS

Jul. 14, 2020, Office Action issued by the China National Intellectual Property Administration in the corresponding Chinese Patent Application No. 201780057240.7 with English language search report.

Ukrainian Patent No. 95569 published on Aug. 10, 2011 in the name of Sumitomo Metal Industries, Ltd. (corresponds to U.S. Pat. No. 8,8523,66B2).

Jun. 26, 2019, the Extended European Search Report issued by the European Patent Office in the corresponding European Patent Application No. 17852718.0.

Feb. 6, 2018, Notification of Reasons for Refusal issued by the Japan Patent Office in the corresponding Japanese Patent Application No. 2017-559487, with English language Concise Statement of Relevance.

Oct. 31, 2017, International Search Report issued in the International Patent Application No. PCT/JP2017/028839.

* cited by examiner

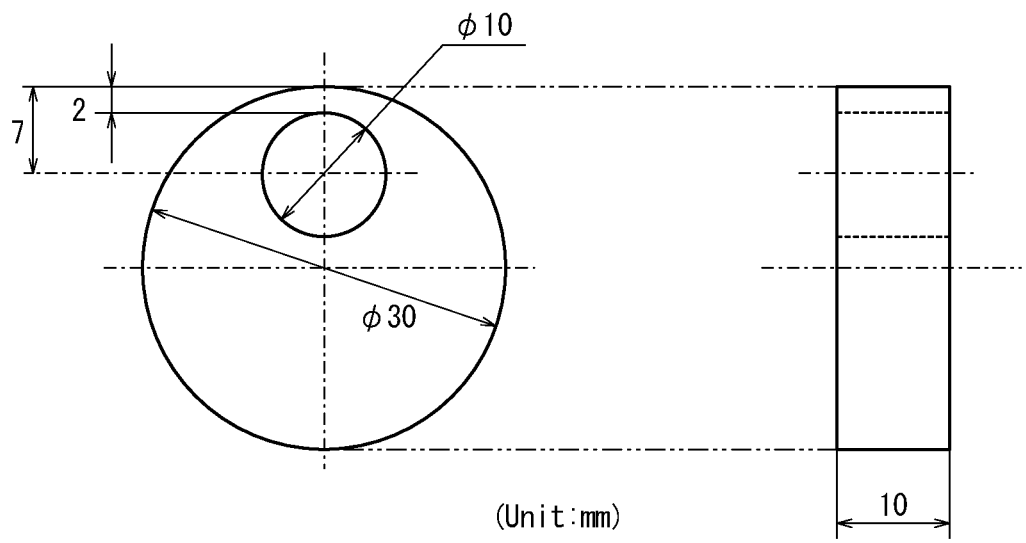
(Unit:mm)

STEEL PIPE OR TUBE FOR PRESSURE VESSELS, METHOD OF PRODUCING STEEL PIPE OR TUBE FOR PRESSURE VESSELS, AND COMPOSITE PRESSURE VESSEL LINER

TECHNICAL FIELD

The present disclosure relates to a steel pipe or tube for pressure vessels, and particularly to a steel pipe or tube for pressure vessels that can be used to produce a pressure vessel for storing high-pressure hydrogen or a liner of a composite pressure vessel. The present disclosure also relates to a method of producing a steel pipe or tube for pressure vessels, and to a composite pressure vessel liner.

BACKGROUND

Fuel cell vehicles using hydrogen as fuel emit no carbon dioxide ($CO_2$) and have excellent energy efficiency, and so are expected to serve as vehicles that can solve $CO_2$ emission problems and energy problems. To put such fuel cell vehicles into wide use, hydrogen stations for supplying hydrogen to fuel cell vehicles need to be installed. This has stimulated the development of vessels (pressure vessels) with excellent strength and durability necessary for safely storing high-pressure hydrogen in hydrogen stations.

Proposed pressure vessels using metal material include: a pressure vessel that is entirely made of metal (Type I); and a composite pressure vessel (Type II, III) formed by coating the outer periphery of a liner made of metal with carbon fiber reinforced plastic (CFRP).

For example, JP 2009-293799 A (PTL 1) proposes a composite pressure vessel whose fatigue crack propagation rate in a high-pressure hydrogen environment is improved by coating the outer periphery of a liner made of Cr—Mo steel with CFRP. A pressure vessel made only of metal needs to be thick in order to have sufficient strength to withstand hydrogen pressure. In the composite pressure vessel described in PTL 1, on the other hand, the liner made of steel and the CFRP share the load, so that the liner can be made thinner than the pressure vessel made only of metal. This contributes to lighter weight and lower cost.

If the liner's share of load can be increased in the composite pressure vessel, the usage of expensive carbon fibers can be reduced, which further contributes to lower cost. This has raised the need to improve the properties of steel material used for composite pressure vessel liners.

To improve the properties of steel material used for pressure vessels, for example, JP 2010-037655 A (PTL 2), JP 2012-107332 A (PTL 3), JP 2009-275249 A (PTL 4), and JP 2009-074122 A (PTL 5) propose the following techniques. PTL 2 proposes a steel material whose hydrogen embrittlement resistance is improved by controlling the chemical composition and microstructure of steel and the precipitates. PTL 3 proposes a steel material whose toughness is improved by making the microstructure of steel composed mainly of bainite and controlling the aspect ratio of precipitated cementite. PTL 4 proposes a steel material whose hydrogen embrittlement resistance is improved by controlling the chemical composition, thus achieving a high reduction of area in high-pressure hydrogen. PTL 5 proposes a steel material whose hydrogen embrittlement resistance is improved by limiting the chemical composition of steel to a predetermined range and controlling carbide formation, thus achieving a high reduction of area in high-pressure hydrogen.

CITATION LIST

Patent Literatures

PTL 1: JP 2009-293799 A
PTL 2: JP 2010-037655 A
PTL 3: JP 2012-107332 A
PTL 4: JP 2009-275249 A
PTL 5: JP 2009-074122 A

SUMMARY

Technical Problem

However, the techniques described in PTL 1 to PTL 5 fail to take liner manufacturability into consideration, although the hydrogen embrittlement resistance or strength of steel material is improved to a certain extent. A pressure vessel used in a hydrogen station or the like is exposed to high-pressure hydrogen gas, and thus the steel material used for the pressure vessel is required to have hydrogen embrittlement resistance. In terms of hydrogen embrittlement resistance, it is effective to have tempered martensite as the metallic microstructure of the steel material.

To obtain tempered martensite microstructure, after heating steel to an austenite region ($Ac_3$ point or more), the steel needs to be cooled at a predetermined cooling rate or more. A higher cooling rate facilitates the obtainment of martensite microstructure. Typical methods of cooling steel at high speed include immersion in a water tank and spraying of water. Depending on the composition of the steel, however, quench cracks, i.e. a phenomenon of cracking when cooled at high speed, may occur. A steel pipe or tube with quench cracks cannot be used as a liner.

There was an example of studying a quench crack prevention method using a steel material having a round bar shape. However, a typical steel material used for a pressure vessel is a thick steel pipe or tube having a wall thickness of 30 mm or more. In the case of water cooling such a steel pipe or tube, the cooling rate differs significantly between the inner surface and the outer surface of the steel pipe or tube, for example because water stays inside the steel pipe or tube. Thus, further quench crack resistance is required as compared with the case of water cooling the round bar. Improvement in the quench crack resistance of the steel material can increase the yield rate in the production of pressure vessels or pressure vessel liners and lower the inspection frequency, so that the pressure vessel production cost can be reduced. Hence, a steel pipe or tube for pressure vessels that has excellent quench crack resistance and is not quench-cracked even at a high cooling rate is desired.

It could therefore be helpful to provide a steel pipe or tube for pressure vessels having excellent quench crack resistance.

Solution to Problem

We conducted detailed research on the influences of the chemical composition and metallic microstructure of a steel pipe or tube for pressure vessels on quench cracking.

We thus provide:

1. A steel pipe or tube for pressure vessels, comprising:
a chemical composition containing (consisting of), in mass %,
C: 0.10% to 0.60%,
Si: 0.01% to 2.0%,
Mn: 0.5% to 5.0%,
P: 0.0001% to 0.020%,
S: 0.0001% to 0.010%,
N: 0.0001% to 0.010%, and
Al: 0.01% to 0.06%,
with the balance being Fe and inevitable impurities; and
a metallic microstructure in which an average grain size of prior austenite grains is 500 μm or less, and an area fraction of microstructures other than ferrite is 50% or more.

2. The steel pipe or tube for pressure vessels according to 1., wherein the chemical composition further contains, in mass %, one or more selected from the group consisting of
Mo: 0.005% to 2.0%, and
Cr: 0.005% to 3.0%.

3. The steel pipe or tube for pressure vessels according to 2., wherein the chemical composition further contains, in mass %, one or more selected from the group consisting of
Ni: 0.005% to 5.0%, and
V: 0.05% to 0.35%.

4. The steel pipe or tube for pressure vessels according to any one of 1. to 3., wherein the chemical composition satisfies a relationship of the following Expression (1):

$$[Mn]+1.30\times[Cr]+2.67\times[Mo]+0.30\times[Ni] \geq 2.15 \quad (1)$$

where brackets in the Expression (1) indicate a content, in mass %, of an element in the brackets, and indicate 0 in the case where the element is not contained.

5. The steel pipe or tube for pressure vessels according to 4., wherein the chemical composition satisfies a relationship of the following Expression (2):

$$[Mn]+1.30\times[Cr]+2.67\times[Mo]+0.30\times[Ni] \geq 2.90 \quad (2)$$

where brackets in the Expression (2) indicate a content, in mass %, of an element in the brackets, and indicate 0 in the case where the element is not contained.

6. The steel pipe or tube for pressure vessels according to any one of 1. to 5., having a wall thickness of 30 mm or more.

7. A method of producing a steel pipe or tube for pressure vessels, comprising:
heating a billet having the chemical composition according to any one of 1. to 3., to a temperature of 1350° C. or less;
rolling and pipe-or-tube-expanding the heated billet under a condition that a pipe or tube expansion finish temperature is 820° C. or more, to obtain a steel pipe or tube whose final wall thickness is 8.5% or more and less than 25.0% of a diameter of the billet; and
cooling the steel pipe or tube obtained in the rolling and pipe-or-tube-expanding, under a condition that an average cooling rate from 800° C. to 300° C. is 1° C./s or more.

8. A method of producing a steel pipe or tube for pressure vessels, comprising:
heating a billet having the chemical composition according to 4., to a temperature of 1350° C. or less;
rolling and pipe-or-tube-expanding the heated billet under a condition that a pipe or tube expansion finish temperature is 820° C. or more, to obtain a steel pipe or tube whose final wall thickness is 8.5% or more and less than 25.0% of a diameter of the billet; and
cooling the steel pipe or tube obtained in the rolling and pipe-or-tube-expanding, under a condition that an average cooling rate from 800° C. to 300° C. is 0.5° C./s or more.

9. A method of producing a steel pipe or tube for pressure vessels, comprising:
heating a billet having the chemical composition according to 5., to a temperature of 1350° C. or less;
rolling and pipe-or-tube-expanding the heated billet under a condition that a pipe or tube expansion finish temperature is 820° C. or more, to obtain a steel pipe or tube whose final wall thickness is 8.5% or more and less than 25.0% of a diameter of the billet; and
cooling the steel pipe or tube obtained in the rolling and pipe-or-tube-expanding, under a condition that an average cooling rate from 800° C. to 300° C. is 0.2° C./s or more.

10. A composite pressure vessel liner, comprising
the steel pipe or tube for pressure vessels according to any one of 1. to 6.

Advantageous Effect

It is thus possible to obtain a steel pipe or tube for pressure vessels having excellent quench crack resistance. The steel pipe or tube for pressure vessels can be used to produce a pressure vessel or pressure vessel liner having excellent reliability at low cost.

BRIEF DESCRIPTION OF THE DRAWINGS

In the accompanying drawings:
FIG. 1 is a diagram illustrating the shape of a test piece used in quench crack resistance evaluation.

DETAILED DESCRIPTION

Detailed description is given below. In the following description, the term "pressure vessel" encompasses both a "composite pressure vessel" (Type 2 pressure vessel) produced by coating the periphery of a liner with carbon fiber reinforced plastic or the like and a "pressure vessel" (Type 1 pressure vessel) without a coating of carbon fiber reinforced plastic or the like. The term "steel pipe or tube for pressure vessels" encompasses both a steel pipe or tube used to produce a Type 1 pressure vessel and a steel pipe or tube used as a liner of a Type 2 pressure vessel.

[Metallic Microstructure]

A steel pipe or tube for pressure vessels according to one of the disclosed embodiments has a metallic microstructure in which the average grain size of prior austenite grains is 500 μm or less and the area fraction of microstructures other than ferrite is 50% or more. The reasons for limiting the metallic microstructure of the steel pipe or tube for pressure vessels in this way are explained below. Herein, "%" regarding metallic microstructure denotes an area fraction unless otherwise noted.

Average grain size of prior austenite grains: 500 μm or less

A larger average grain size of prior austenite grains (hereafter also referred to as "prior γ grain size") contributes to improved quench hardenability, and thus facilitates the obtainment of martensite microstructure. In a thick steel pipe or tube with a wall thickness of 20 mm or more, if the prior γ grain size is excessively large, the prior γ grain size in heat treatment is excessively large, which makes it difficult to suppress quench cracks. The prior γ grain size is therefore 500 μm or less. The prior γ grain size is preferably 400 μm or less. No lower limit is placed on the prior γ grain size, yet an excessively small prior γ grain size causes an increase in production cost. Accordingly, the prior γ grain size is preferably more than 20 μm, and more preferably 50 μm or more. If the prior γ grain size is more than 20 μm, ferrite microstructure after heat treatment can be reduced. Consequently, the strength can be ensured easily, and the reduction of area can be improved. This further improves the reliability of the pressure vessel.

Area fraction of microstructures other than ferrite: 50% or more

If the total area fraction of microstructures other than ferrite to the whole metallic microstructure (hereafter also referred to as "area fraction other than ferrite") is less than 50%, the prior γ grain size in heat treatment is excessively large, which makes it difficult to suppress quench cracks. The area fraction other than ferrite is therefore 50% or more. The area fraction other than ferrite is preferably 60% or more, further preferably 70% or more, and most preferably 90% or more. A higher area fraction other than ferrite is more desirable, and thus the area fraction other than ferrite may be 100% at the maximum.

The microstructures other than ferrite preferably include at least one of martensite and bainite. The total area fraction of martensite and bainite to the whole metallic microstructure is preferably 50% or more, more preferably 70% or more, and further preferably 90% or more. A higher total area fraction of martensite and bainite is more desirable, and thus the total area fraction of martensite and bainite may be 100% at the maximum.

[Chemical Composition]

In the present disclosure, it is also important that the steel pipe or tube for pressure vessels has the chemical composition described above. The reasons for limiting the chemical composition in the present disclosure are explained below. Herein, "%" regarding components denotes mass % unless otherwise noted.

C: 0.10% to 0.60%

C is an element necessary to increase the strength of the pressure vessel. A liner after quenching and tempering preferably has a tensile strength of 800 MPa or more. To obtain such strength, the C content is 0.10 or more. The C content is preferably 0.33% or more. If the C content is more than 0.60%, quench cracks occur. The C content is therefore 0.60% or less. The C content is preferably 0.45% or less.

Si: 0.01% to 2.0%

Si is an element that contributes to improved strength by solid solution strengthening. To achieve the effect, the Si content is 0.01% or more. The Si content is preferably 0.15% or more. If the Si content is more than 2.0%, the effect is saturated. Besides, the surface characteristics of the steel material degrade, and rollability decreases. The Si content is therefore 2.0% or less. The Si content is preferably 0.5% or less.

Mn: 0.5% to 5.0%

Mn is an element that contributes to improved strength by solid solution strengthening and quench hardenability improvement. Mn also suppresses excessive coarsening of prior austenite grains and ferrite transformation. To achieve these effects, the Mn content is 0.5% or more. The Mn content is preferably 0.6% or more. If the Mn content is more than 5.0%, the effects are saturated, and also rolling and forming are difficult. Besides, if the Mn content is more than 5.0%, austenite remains after heat treatment following liner forming, causing a decrease in fatigue resistance. The Mn content is therefore 5.0% or less. The Mn content is preferably 1.5 or less.

P: 0.0001% to 0.020%

P is an element that contributes to improved strength by solid solution strengthening, but our study revealed that P decreases the quench crack resistance of the steel. If the P content is more than 0.020%, quench cracks occur in liner heat treatment. To improve the quench crack resistance, it is very important that the P content is 0.020% or less. The P content is preferably 0.015% or less, and more preferably 0.010% or less. Excessively reducing P so that the P content is less than 0.0001% increases the production cost in the steelmaking process. The P content is therefore 0.0001% or more.

S: 0.0001% to 0.010%

Excessive S causes hot red shortness, which may lead to manufacturing defects. S also forms MnS as an inclusion, and decreases toughness. These problems do not occur as long as the S content is 0.010% or less. The S content is therefore 0.010% or less. The S content is preferably 0.0050% or less, and more preferably 0.0030% or less. Excessively reducing S so that the S content is less than 0.0001% increases the desulfurization cost in the steelmaking process. The S content is therefore 0.0001% or more.

The total content of P and S is preferably 0.025% or less, in terms of improving toughness.

N: 0.0001% to 0.010%

N has little influence on the fatigue resistance of the steel material, and the advantageous effects according to the present disclosure are not lessened if the N content is 0.010% or less. The N content is therefore 0.010% or less. The N content is preferably 0.006% or less, and more preferably 0.004% or less. The N content is desirably low in terms of improving toughness. However, excessively reducing N increases the cost in steelmaking, and so the N content is 0.0001% or more. The N content is preferably 0.0010% or more.

Al: 0.01% to 0.06%

Al is an element effective as a deoxidizer in the steelmaking process. To achieve the effect, the Al content is 0.01% or more. The Al content is preferably 0.02% or more. If the Al content is more than 0.06%, the effect is saturated. The Al content is therefore 0.06% or less.

The steel pipe or tube for pressure vessels according to one of the disclosed embodiments has a chemical composition containing the components described above with the balance being Fe and inevitable impurities.

In another one of the disclosed embodiments, the chemical composition may further contain one or more selected from the group consisting of Mo: 0.005% to 2.0% and Cr: 0.005% to 3.0%.

Mo: 0.005% to 2.0%

Mo is an element that improves quench hardenability, and has a function of contributing to higher liner strength and improving the quench hardenability of the steel material to increase the ratio of microstructures (in particular, martensite and lower bainite) other than ferrite in the metallic microstructure. Mo also suppresses ferrite transformation to improve the quench crack resistance. Furthermore, by adding Mo, the cooling rate necessary to obtain the above-described metallic microstructure can be lowered, and the risk of quench cracks in liner heat treatment can be reduced. To achieve these effects, in the case of adding Mo, the Mo content is 0.005% or more. The Mo content is preferably 0.10% or more. If the Mo content is more than 2.0%, the effects are saturated, and higher cost is required. The Mo content is therefore 2.0% or less. The Mo content is preferably 1.0% or less, more preferably 0.5% or less, and further preferably 0.3% or less.

Cr: 0.005% to 3.0%

Cr is an element that improves quench hardenability, and has a function of contributing to higher liner strength and improving the quench hardenability of the steel material to increase the ratio of microstructures (in particular, martensite and lower bainite) other than ferrite in the metallic microstructure. Cr also suppresses ferrite transformation to improve the quench crack resistance. Furthermore, by adding Cr, the cooling rate necessary to obtain the above-described microstructure can be lowered, and the risk of quench cracks in liner heat treatment can be reduced. Cr also suppresses coarsening of prior austenite grains. To achieve these effects, in the case of adding Cr, the Cr content is 0.005% or more. The Cr content is preferably 0.1% or more, more preferably 0.5% or more, and further preferably 0.7% or more. If the Cr content is more than 3.0%, the effects are saturated, and higher cost is required. The Cr content is therefore 3.0% or less. The Cr content is preferably 2.0% or less, and more preferably 1.5% or less.

In another one of the disclosed embodiments, the chemical composition may further contain one or more selected from the group consisting of Ni: 0.005% to 5.0% and V: 0.05% to 0.35%, in addition to the elements described above.

Ni: 0.005% to 5.0%

Ni is an element that improves quench hardenability, and has a function of contributing to higher liner strength and improving the quench hardenability of the steel material to increase the ratio of microstructures (in particular, martensite and lower bainite) other than ferrite in the metallic microstructure. Ni also suppresses ferrite transformation to improve the quench crack resistance. Furthermore, by adding Ni, the cooling rate necessary to obtain the above-described microstructure can be lowered, and the risk of quench cracks in liner heat treatment can be reduced. Ni also suppresses coarsening of prior austenite grains. To achieve these effects, in the case of adding Ni, the Ni content is 0.005% or more. The Ni content is preferably 0.5% or more. If the Ni content is more than 5.0%, the effects are saturated, and higher cost is required. The Ni content is therefore 5.0% or less. For cost reduction, the Ni content is preferably 3.0% or less, and more preferably 2.0% or less.

V: 0.05% to 0.35%

V is an element effective in improving hardness and strength (yield point, tensile strength) when used in combination with other elements such as Cr and Mo. To achieve the effect, in the case of adding V, the V content is 0.05% or more. If the V content is more than 0.35%, carbide coarsens, and the steel may become brittle. Accordingly, the V content is 0.35% or less.

The chemical composition preferably satisfies the relationship of the following Expression (1):

$$[Mn]+1.30\times[Cr]+2.67\times[Mo]+0.30\times[Ni]\geq 2.15 \quad (1)$$

(where the brackets in Expression (1) indicate the content (mass %) of the element in the brackets, and indicate 0 in the case where the element is not contained).

When the chemical composition of the steel pipe or tube for pressure vessels satisfies the relationship of Expression (1), the quench hardenability of the steel is improved, so that microstructures other than ferrite can be obtained more easily, and the necessary cooling rate can be lowered. Moreover, the risk of quench cracks in liner heat treatment can be reduced.

The chemical composition preferably satisfies the relationship of the following Expression (2):

$$[Mn]+1.30\times[Cr]+2.67\times[Mo]+0.30\times[Ni]\geq 2.90 \quad (2)$$

(where the brackets in Expression (2) indicate the content (mass %) of the element in the brackets, and indicate 0 in the case where the element is not contained).

When the chemical composition of the steel pipe or tube for pressure vessels satisfies the relationship of Expression (2), the quench hardenability of the steel is further improved, so that microstructures other than ferrite can be obtained very easily, and the necessary cooling rate can be further lowered. Moreover, the risk of quench cracks in liner heat treatment can be further reduced.

No upper limit is placed on the value of the left side in Expressions (1) and (2), yet the upper limit may be 15.74 determined from the upper limits of the contents of Mn, Cr, Mo, and Ni. In other words, the chemical composition may satisfy the relationship of the following Expression (3):

$$15.74[Mn]+1.30\times[Cr]+2.67\times[Mo]+0.30\times[Ni] \quad (3).$$

[Shape]

The steel pipe or tube for pressure vessels according to the present disclosure is preferably a seamless steel pipe or tube.

[Wall Thickness]

Wall thickness: 30 mm or more

If the wall thickness of the steel pipe or tube for pressure vessels is 30 mm or more, the obtained liner's share of stress can be further increased. This reduces the usage of CFRP, and contributes to lower cost of composite pressure vessels. The fatigue limit in high-pressure hydrogen can be further improved by forming a steel pipe or tube with a wall thickness of 30 mm or more to obtain a liner and then subjecting the liner to autofrettage to apply residual compressive stress to the inside of the liner. The wall thickness of the steel pipe or tube for pressure vessels is therefore preferably 30 mm or more, more preferably 35 mm or more, and further preferably 40 mm or more. If the wall thickness is excessively thick, the stress of the outside of the liner may become excessively high during pressure storage. Besides, the necessary amount of alloy to obtain the desired microstructure increases, which requires higher cost. Accordingly, the wall thickness is preferably 80 mm or less, more preferably 70 mm or less, and further preferably 60 mm or less. A typical steel pipe or tube has uniform wall thickness in all parts. However, in the case where the wall thickness differs depending on position, it is preferable that the wall thickness of the steel pipe or tube in the longitudinal center is in the range described above. This is because, when the steel pipe or tube for pressure vessels is used as a pressure vessel or a pressure vessel liner, its longitudinal center is under maximum stress.

[Production Method]

A method of producing a steel pipe or tube for pressure vessels according to the present disclosure is described below.

The steel pipe or tube for pressure vessels according to the present disclosure can be produced by performing the following (1) to (3) in order:

(1) heating a billet;

(2) rolling and pipe-or-tube-expanding the heated billet to obtain a steel pipe or tube; and (3) cooling the steel pipe or tube obtained in the rolling and pipe-or-tube-expanding.

Each of these processes is described below. The temperatures in the following description of the heating, the rolling and pipe or tube expansion, and the cooling each denote the temperature of the outer surface of the billet or steel pipe or tube unless otherwise noted.

[Heating]

A billet having the chemical composition described above is heated in order to perform hot rolling. The billet is not limited, and may be, for example, a billet obtained by typical continuous casting.

Heating temperature: 1350° C. or less

If the heating temperature in the heating is more than 1350° C., the cost increases significantly. The heating temperature is therefore 1350° C. or less. The heating temperature is preferably 1300° C. or less. Although a lower heating temperature is more preferable, if the heating temperature is excessively low, the temperature of the raw material decreases before the final process, and the deformation resistance in the rolling and pipe or tube expansion increases. This makes the rolling and pipe or tube expansion difficult. The heating temperature is therefore preferably 950° C. or more, more preferably 1000° C. or more, and further preferably 1050° C. or more.

[Rolling and Pipe or Tube Expansion]

Next, the billet heated in the heating is rolled and pipe-or-tube-expanded to obtain a steel pipe or tube. The rolling may be hot rolling including piercing rolling by typical Mannesmann plug mill process or Mannesmann mandrel mill process.

Pipe or tube expansion finish temperature: 820° C. or more

If the pipe or tube expansion finish temperature is less than 820° C., the load of rolling and pipe or tube expansion increases, which makes the production difficult. The pipe or tube expansion finish temperature is therefore 820° C. or more. Moreover, if the pipe or tube expansion finish temperature is less than 820° C., it is hard to achieve an area fraction of microstructures other than ferrite of 50% or more. The pipe or tube expansion finish temperature is preferably 850° C. or more. Although no upper limit is placed on the pipe or tube expansion finish temperature, if the pipe or tube expansion finish temperature is excessively high, the metallic microstructure tends to be not uniform. The pipe or tube expansion finish temperature is therefore preferably 1200° C. or less, more preferably 1100° C. or less, and further preferably 1050° C. or less.

Final wall thickness: 8.5% or more and less than 25.0% of billet diameter

If the final wall thickness of the steel pipe or tube obtained as a result of the rolling and pipe or tube expansion (hereafter also simply referred to as "final wall thickness") is 25.0% or more of the diameter of the billet used, strain is low, so that the prior γ grain size exceeds 500 μm, causing insufficient quench crack resistance. Accordingly, the final wall thickness is less than 25.0% of the billet diameter. The final wall thickness is preferably 23.0% or less of the billet diameter, and more preferably 20.0% or less of the billet diameter. If the final wall thickness is excessively small as compared with the billet diameter, prior γ grains are refined due to applied strain. This facilitates the formation of ferrite. Accordingly, the final wall thickness is 8.5% or more of the billet diameter. The final wall thickness is preferably 9.0% or more of the billet diameter.

[Cooling]

The steel pipe or tube obtained in the rolling and pipe or tube expansion is then cooled. Here, the cooling rate needs to be controlled in the below-described manner, in order to obtain the desired metallic microstructure. The cooling method is not limited, and any of the methods such as water cooling, oil quenching, and air cooling may be used singly or in combination.

Average Cooling Rate from 800° C. to 300° C.: 1° C./s or More

If the average cooling rate from 800° C. to 300° C. (hereafter also simply referred to as "average cooling rate") is less than 1° C./s, ferrite forms at an area fraction of 50% or more. This causes an excessively large prior γ grain size in liner heating, and makes it difficult to ensure quench crack resistance. The average cooling rate is therefore 1° C./s or more. Although no upper limit is placed on the average cooling rate, special equipment is needed in order to realize an excessively high cooling rate, which causes an increase in cost. The average cooling rate is therefore preferably 200° C./s or less.

In the case where the chemical composition of the steel pipe or tube satisfies the relationship of Expression (1) as mentioned above, the desired microstructure can be obtained if the average cooling rate is 0.5° C./s or more. In the case where the chemical composition of the steel pipe or tube satisfies the relationship of Expression (2) as mentioned above, the desired microstructure can be obtained if the average cooling rate is 0.2° C./s or more.

The cooling rate in a temperature range below 300° C. is not limited, and the steel pipe or tube can be cooled to room temperature under any conditions. This is because the transformation of the microstructure of the material basically ends at a temperature not lower than 300° C.

[Pressure Vessel]

A pressure vessel can be produced from the steel pipe or tube for pressure vessels obtained as described above. The method of producing the pressure vessel is not limited, and may be any method. Typically, the steel pipe or tube for pressure vessels is further subjected to heat treatment of quenching and tempering, to achieve mechanical properties required of pressure vessels. The heat treatment method differs depending on the required mechanical properties, yet typically the steel pipe or tube for pressure vessels is heated to 850° C. or more, then cooled, and then tempered in a temperature range of 400° C. or more and 700° C. or less, to adjust the mechanical properties.

In the case where a decarburized layer resulting from the heat treatment is formed at the inner and/or outer surface of the steel pipe or tube after the heat treatment, the decarburized layer is removed because the metallic microstructure of the surface layer was changed. The roughness of the inner surface of the steel pipe or tube influences the fatigue resistance, and is therefore preferably as low as possible. It is more preferable to perform surface polishing. Specifically, cut finishing, polish finishing, or mirror finishing is preferable, and polish finishing or mirror finishing is more preferable. In the case where the steel pipe or tube is bent due to the heat treatment, the bend may be corrected by straightening.

Further, both ends of the steel pipe or tube are sealed to obtain a pressure vessel. Examples of the sealing method include a method of shaping both ends of the steel pipe or tube in capsule form to cover the ends, and a method of providing a screw structure at both ends of the steel pipe or tube and attaching a lid to it. An O-ring or a back-up ring may be used to improve airtightness. The pressure vessel is further provided with an inlet and an outlet connectable with a gas exchange pipe.

[Composite Pressure Vessel]

The steel pipe or tube for pressure vessels according to the present disclosure can also be used as a composite pressure vessel liner. For example, a composite pressure vessel can be obtained by wrapping carbon fiber reinforced plastic (CFRP) around the surface of the pressure vessel produced as described above. Any carbon fibers such as PAN-based carbon fibers or pitch-based carbon fibers may be used.

Examples

More detailed description is given below, based on examples. The following examples merely represent preferred examples, and the present disclosure is not limited to these examples.

Pressure vessel steel pipes or tubes were produced using billets having the chemical compositions listed in Table 1. In the production, first, each billet was subjected to the processes of heating, rolling and pipe or tube expansion, and cooling in sequence. The conditions in each of the processes are listed in Table 2. The metallic microstructure, tensile strength, and quench crack resistance of each obtained steel pipe or tube for pressure vessels were then evaluated. The evaluation methods are as follows.

(Average Grain Size of Prior Austenite Grains)

From each obtained steel pipe or tube, a test piece was collected so that the position of ¼ of the wall thickness in the longitudinal center part of the steel pipe or tube was an observation position. A section of the test piece was etched using a saturated picric acid solution to reveal prior austenite crystal grain boundaries, and the metallic microstructure was photographed using an optical microscope. The obtained photograph was subjected to image analysis, to calculate the average grain size of prior austenite grains.

(Metallic Microstructure)

From each obtained steel pipe or tube, a test piece was collected so that the position of ¼ of the wall thickness in the longitudinal center part of the steel pipe or tube was an observation position. A section of the test piece was etched using a 3% nital solution. The section was then observed using a scanning electron microscope (SEM) at appropriate magnifications from 1000 to 5000, and the obtained image was analyzed to evaluate the type and area fraction of each microstructure. Retained austenite was measured by X-ray diffraction measurement.

(Tensile Strength)

Each steel pipe or tube was cut to a length of 150 mm, and subjected to heat treatment (quenching and tempering). In the heat treatment, the cut steel pipe or tube was held at 860° C. for 120 min, then water cooled, and tempered at 620° C. for 180 min. A round bar test piece of 7 mm in diameter was collected from the position of ¼ of the wall thickness of the steel pipe or tube after the heat treatment according to JIS Z 2201, and its tensile strength was measured.

(Quench Crack Resistance)

To evaluate the quench crack resistance of each steel pipe or tube, the quench crack frequency was calculated by the following method. First, ten test pieces were collected from the position of ¼ of the wall thickness of each obtained steel pipe or tube. The test pieces had the shape illustrated in FIG. 1. The test pieces were then quenched. The quenching was performed by heating each test piece at 860° C. for 120 min and then water cooling the test piece. Whether or not the test pieces after the quenching had cracks was examined, and the proportion of the number of cracked test pieces to the ten test pieces, i.e. (the number of quench-cracked test pieces/10)× 100(%), was taken to be the quench crack frequency.

As can be understood from the results listed in Table 2, the steel pipes or tubes satisfying the conditions according to the present disclosure had excellent tensile strength, and had excellent quench crack resistance with a quench crack frequency of 20% or less in the heat treatment. The fatigue crack propagation characteristics were also improved. On the other hand, the steel pipes or tubes of comparative examples not satisfying the conditions according to the present disclosure had insufficient quench crack resistance with a quench crack frequency of more than 20%.

Thus, the liner steel pipe or tube according to the present disclosure has sufficient quench crack resistance. Such a steel pipe or tube for pressure vessels according to the present disclosure can be used to efficiently produce a pressure vessel or a composite pressure vessel liner, with it being possible to reduce the cost of pressure vessels.

TABLE 1

| Steel sample ID | Chemical composition (mass %)[1] | | | | | | | | | | | |
|---|---|---|---|---|---|---|---|---|---|---|---|---|
| | C | Si | Mn | P | S | Al | N | Mo | Cr | Ni | P + S | [Mn] + 1.3[Cr] + 2.67[Mo] + 0.3[Ni] |
| A | 0.30 | 0.20 | 0.75 | 0.008 | 0.0030 | 0.03 | 0.0030 | 0.16 | 1.01 | — | 0.011 | 2.49 |
| B | 0.30 | 0.20 | 0.75 | 0.010 | 0.0030 | 0.03 | 0.0030 | — | — | — | 0.013 | 0.75 |
| C | 0.30 | 0.20 | 0.75 | 0.015 | 0.0030 | 0.03 | 0.0030 | 0.16 | 1.01 | — | 0.018 | 2.49 |
| D | 0.30 | 0.20 | 0.75 | 0.020 | 0.0030 | 0.03 | 0.0030 | 0.16 | 1.01 | — | 0.023 | 2.49 |
| E | 0.35 | 0.25 | 0.80 | 0.020 | 0.0031 | 0.04 | 0.0015 | 0.12 | 1.30 | 1.62 | 0.023 | 3.30 |
| F | 0.05 | 0.18 | 0.61 | 0.010 | 0.0029 | 0.03 | 0.0022 | 0.15 | 0.92 | — | 0.013 | 2.21 |
| G | 0.30 | 0.20 | 0.75 | 0.025 | 0.0030 | 0.03 | 0.0030 | 0.16 | 1.01 | — | 0.028 | 2.49 |
| H | 0.30 | 0.20 | 0.75 | 0.040 | 0.0030 | 0.03 | 0.0030 | 0.16 | 1.01 | — | 0.043 | 2.49 |
| I | 0.30 | 0.20 | 0.75 | 0.0003 | 0.0030 | 0.03 | 0.0030 | 0.16 | 1.01 | — | 0.003 | 2.49 |
| J | 0.45 | 0.20 | 0.75 | 0.0001 | 0.0001 | 0.01 | 0.0001 | 0.005 | 3.00 | — | 0.000 | 4.66 |
| K | 0.10 | 2.00 | 0.75 | 0.0001 | 0.0001 | 0.01 | 0.0100 | 2.00 | 1.01 | — | 0.000 | 7.40 |
| L | 0.60 | 0.01 | 0.75 | 0.0001 | 0.0100 | 0.06 | 0.0001 | 0.16 | 1.01 | — | 0.010 | 2.49 |
| M | 0.30 | 0.20 | 0.75 | 0.0001 | 0.0200 | 0.01 | 0.0001 | 0.16 | 1.01 | — | 0.020 | 2.49 |
| N | 0.35 | 0.25 | 1.00 | 0.020 | 0.0031 | 0.04 | 0.0015 | 0.12 | 1.30 | 3.00 | 0.023 | 3.91 |
| O | 0.35 | 0.25 | 5.00 | 0.020 | 0.0031 | 0.04 | 0.0015 | 0.12 | 0.005 | 0.005 | 0.023 | 5.33 |

| Steel sample ID | Condition of Expression (1) | Condition of Expression (2) | $Ac_3$*[2] (° C.) | Remarks |
|---|---|---|---|---|
| A | Satisfied | Not satisfied | 788 | Conforming steel |
| B | Not satisfied | Not satisfied | 795 | Conforming steel |
| C | Satisfied | Not satisfied | 793 | Conforming steel |
| D | Satisfied | Not satisfied | 796 | Conforming steel |
| E | Satisfied | Satisfied | 760 | Conforming steel |
| F | Satisfied | Not satisfied | 859 | Comparative steel |
| G | Satisfied | Not satisfied | 800 | Comparative steel |
| H | Satisfied | Not satisfied | 810 | Comparative steel |

TABLE 1-continued

| | | | | |
|---|---|---|---|---|
| I | Satisfied | Not satisfied | 782 | Conforming steel |
| J | Satisfied | Satisfied | 728 | Conforming steel |
| K | Satisfied | Satisfied | 966 | Conforming steel |
| L | Satisfied | Not satisfied | 731 | Conforming steel |
| M | Satisfied | Not satisfied | 780 | Comparative steel |
| N | Satisfied | Satisfied | 733 | Conforming steel |
| O | Satisfied | Satisfied | 673 | Conforming steel |

*[1] the balance being Fe and inevitable impurities
*[2] $Ac_3$ (° C.) = $910 - 203[C]^{1/2} - 30[Mn] + 44.7[Si] + 700[P] + 100[Al] + 31.5[Mo] - 11[Cr] - 15.2[Ni] - 20[Cu] + 104[V]$
where brackets in the expression indicate the content (mass %) of the element in the brackets, and indicate 0 in the case where the element is not contained.

TABLE 2

| | | | | | Production conditions | | | |
|---|---|---|---|---|---|---|---|---|
| | | | | | Rolling and pipe or tube expansion | | | |
| No. | Steel sample ID | Condition of Expression (1) | Condition of Expression (2) | $Ac_3$ point (° C.) | Heating Heating temperature (° C.) | Pipe or tube expansion finish temperature (° C.) | Final wall thickness (mm) | Final wall thickness/ billet diameter (%) | Cooling Average cooling rate*[1] (° C./s) |
| 1 | A | Satisfied | Not satisfied | 788 | 1200 | 860 | 60 | 17.1 | 15 |
| 2 | A | Satisfied | Not satisfied | 788 | 1200 | <u>750</u> | 60 | 17.1 | 15 |
| 3 | A | Satisfied | Not satisfied | 788 | 1200 | 860 | 60 | <u>40.0</u> | 15 |
| 4 | B | Not satisfied | Not satisfied | 795 | 1100 | 900 | 38 | 10.9 | 30 |
| 5 | B | Not satisfied | Not satisfied | 795 | 1100 | 900 | 38 | 10.9 | <u>0.7</u> |
| 6 | C | Satisfied | Not satisfied | 793 | 1250 | 950 | 46 | 13.1 | 10 |
| 7 | D | Satisfied | Not satisfied | 796 | 1150 | 850 | 46 | 22.0 | 5 |
| 8 | E | Satisfied | Satisfied | 760 | 1250 | 1000 | 46 | 13.1 | 1 |
| 9 | E | Satisfied | Satisfied | 760 | 1250 | 1000 | 100 | <u>30.3</u> | 0.5 |
| 10 | E | Satisfied | Satisfied | 760 | 1250 | 1000 | 35 | 10.6 | 1 |
| 11 | E | Satisfied | Satisfied | 760 | 1250 | 1000 | 30 | <u>6.0</u> | 0.2 |
| 12 | <u>F</u> | Satisfied | Not satisfied | 859 | 1200 | 900 | 50 | 14.3 | 30 |
| 13 | <u>G</u> | Satisfied | Not satisfied | 800 | 1200 | 860 | 60 | 17.1 | 15 |
| 14 | <u>H</u> | Satisfied | Not satisfied | 810 | 1200 | 860 | 60 | 17.1 | 15 |
| 15 | I | Satisfied | Not satisfied | 782 | 1150 | 850 | 46 | 22.0 | 5 |
| 16 | J | Satisfied | Satisfied | 728 | 1200 | 860 | 60 | 17.1 | 10 | 40 |
| 17 | K | Satisfied | Satisfied | 966 | 1200 | 860 | 60 | 17.1 | 10 | 40 |
| 18 | L | Satisfied | Not satisfied | 731 | 1200 | 860 | 60 | 17.1 | 10 | 40 |
| 19 | <u>M</u> | Satisfied | Not satisfied | 780 | 1200 | 860 | 60 | 17.1 | 10 | 40 |
| 20 | N | Satisfied | Satisfied | 733 | 1200 | 860 | 60 | 17.1 | 10 | 40 |
| 21 | O | Satisfied | Satisfied | 673 | 1200 | 860 | 60 | 17.1 | 10 | 40 |

| | Metallic microstructure | | | Properties after heat treatment | | |
|---|---|---|---|---|---|---|
| No. | Area fraction other than ferrite (%) | Microstructures other than ferrite*[2] | Prior γ grain size (μm) | Tensile strength (MPa) | Quench crack frequency (%) | Remarks |
| 1 | 100 | M, B | 150 | 913 | 0 | Example |
| 2 | <u>40</u> | M, B, P | 80 | 911 | 50 | Comparative Example |
| 3 | 100 | M, B | <u>600</u> | 910 | 50 | Comparative Example |
| 4 | 90 | M, B | 230 | 912 | 0 | Example |
| 5 | <u>20</u> | B, P | 60 | 875 | 40 | Comparative Example |
| 6 | 100 | M, B | 270 | 923 | 10 | Example |
| 7 | 95 | M, B, RA | 90 | 911 | 20 | Example |
| 8 | 98 | M, B, RA | 320 | 893 | 0 | Example |
| 9 | 80 | M, B, RA | <u>550</u> | 891 | 50 | Comparative Example |
| 10 | 98 | M, B, RA | 280 | 890 | 5 | Example |
| 11 | <u>40</u> | B, P | 10 | 756 | 25 | Comparative Example |
| 12 | <u>30</u> | B, P | 300 | 722 | 0 | Comparative Example |
| 13 | 100 | M, B | 150 | 906 | 40 | Comparative Example |
| 14 | 100 | M, B | 150 | 903 | 80 | Comparative Example |
| 15 | 95 | M, B, RA | 90 | 897 | 10 | Example |
| 16 | 95 | M, B | 155 | 950 | 0 | Example |
| 17 | 100 | M | 200 | 720 | 0 | Example |
| 18 | 100 | M, B | 160 | 1300 | 10 | Example |
| 19 | 95 | M, B | 150 | 900 | 25 | Comparative Example |
| 20 | 95 | M, B | 180 | 850 | 0 | Example |
| 21 | 95 | M, B | 190 | 900 | 0 | Example |

*[1] average cooling rate from 800 to 300° C.
*[2] M: martensite, B: bainite, F: ferrite, RA: retained austenite, P: pearlite

The invention claimed is:

1. A steel pipe or tube for pressure vessels, comprising:
   a chemical composition consisting of, in mass %,
   C: 0.30% to 0.60%,
   Si: 0.01% to 2.0%,
   Mn: 0.5% to 5.0%,
   P: 0.0001% to 0.020%,
   S: 0.0001% to 0.010%,
   N: 0.0001% to 0.010%,
   Al: 0.01% to 0.06%, and
   optionally
     one or more selected from Mo: 0.005% to 2.0%, and Cr: 0.005% to 3.0%, and
     one or more selected from Ni: 0.005% to 5.0%, and V: 0.05% to 0.35%,
     with the balance being Fe and inevitable impurities; and
   a metallic microstructure in which an average grain size of prior austenite grains is 50 μm or more and 500 μm or less, and an area fraction of microstructures other than ferrite is 50% or more, and
   a wall thickness of the steel pipe or tube for pressure vessels is 30 mm or more.

2. The steel pipe or tube for pressure vessels according to claim 1, wherein the chemical composition satisfies a relationship of the following Expression (1):

$$[Mn]+1.30\times[Cr]+2.67\times[Mo]+0.30\times[Ni]\geq 2.15 \quad (1)$$

where brackets in the Expression (1) indicate a content, in mass %, of an element in the brackets, and indicate 0 in the case where the element is not contained.

3. The steel pipe or tube for pressure vessels according to claim 2, wherein the chemical composition satisfies a relationship of the following Expression (2):

$$[Mn]+1.30\times[Cr]+2.67\times[Mo]+0.30\times[Ni]\geq 2.90 \quad (2)$$

where brackets in the Expression (2) indicate a content, in mass %, of an element in the brackets, and indicate 0 in the case where the element is not contained.

4. A method of producing the steel pipe or tube for pressure vessels of claim 1, comprising:
   heating a billet having the chemical composition according to claim 1, to a temperature of 1350° C. or less;
   rolling and pipe-or-tube-expanding the heated billet under a condition that a pipe or tube expansion finish temperature is 820° C. or more, to obtain a steel pipe or tube whose final wall thickness is 8.5% or more and less than 25.0% of a diameter of the billet; and
   cooling the steel pipe or tube obtained in the rolling and pipe-or-tube-expanding, under a condition that an average cooling rate from 800° C. to 300° C. is 1° C./s or more.

5. A method of producing the steel pipe or tube for pressure vessels of claim 2, comprising:
   heating a billet having the chemical composition according to claim 2, to a temperature of 1350° C. or less;
   rolling and pipe-or-tube-expanding the heated billet under a condition that a pipe or tube expansion finish temperature is 820° C. or more, to obtain a steel pipe or tube whose final wall thickness is 8.5% or more and less than 25.0% of a diameter of the billet; and
   cooling the steel pipe or tube obtained in the rolling and pipe-or-tube-expanding, under a condition that an average cooling rate from 800° C. to 300° C. is 0.5° C./s or more.

6. A method of producing the steel pipe or tube for pressure vessels of claim 3, comprising:
   heating a billet having the chemical composition according to claim 3, to a temperature of 1350° C. or less;
   rolling and pipe-or-tube-expanding the heated billet under a condition that a pipe or tube expansion finish temperature is 820° C. or more, to obtain a steel pipe or tube whose final wall thickness is 8.5% or more and less than 25.0% of a diameter of the billet; and
   cooling the steel pipe or tube obtained in the rolling and pipe-or-tube-expanding, under a condition that an average cooling rate from 800° C. to 300° C. is 0.2° C./s or more.

7. A composite pressure vessel liner, comprising
   the steel pipe or tube for pressure vessels according to claim 1.

* * * * *